United States Patent
Thigpen (10) Patent No.: US 9,891,401 B2
(45) Date of Patent: Feb. 13, 2018

(54) MID-SPAN DROP CABLE CLAMP AND METHOD

(71) Applicant: CommScope Technologies LLC, Hickory, NC (US)

(72) Inventor: Thomas A. Thigpen, Highland Village, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/429,428

(22) Filed: Feb. 10, 2017

(65) Prior Publication Data

US 2017/0235082 A1 Aug. 17, 2017

Related U.S. Application Data

(60) Provisional application No. 62/294,761, filed on Feb. 12, 2016.

(51) Int. Cl.
*G02B 6/44* (2006.01)
*G02B 6/48* (2006.01)

(52) U.S. Cl.
CPC .............. *G02B 6/4471* (2013.01); *G02B 6/48* (2013.01)

(58) Field of Classification Search
CPC ........... G02B 6/4471; G02B 6/48; G02B 6/44
See application file for complete search history.

(56) References Cited

U.S. PATENT DOCUMENTS

| | | | | |
|---|---|---|---|---|
| 8,362,359 B1* | 1/2013 | Laws | .................. | G02B 6/4435 174/117 F |
| 8,824,852 B2* | 9/2014 | Harvey | ................ | G02B 6/4471 385/136 |
| 8,903,216 B2* | 12/2014 | Thompson | ........... | G02B 6/4477 385/134 |
| 9,008,483 B2* | 4/2015 | Larsson | ................. | G02B 6/445 385/135 |
| 2006/0153362 A1* | 7/2006 | Bloodworth | ......... | G02B 6/4448 379/413.02 |
| 2012/0230646 A1* | 9/2012 | Thompson | ........... | G02B 6/4477 385/135 |
| 2013/0223808 A1* | 8/2013 | Harvey | ................ | G02B 6/4471 385/136 |
| 2014/0023334 A1* | 1/2014 | Larsson | ................. | G02B 6/445 385/135 |
| 2017/0235082 A1* | 8/2017 | Thigpen | ............... | G02B 6/4471 385/136 |

* cited by examiner

*Primary Examiner* — Andrew Jordan
(74) *Attorney, Agent, or Firm* — Merchant & Gould P.C.

(57) ABSTRACT

A mid-span clamp includes an elongate base that defines a cable channel on a top side. The clamp includes a first pressure block connected to the base by a first control arm. The first pressure block includes a clamping surface and a top surface. The top surface includes a cleat. The clamp includes a second pressure block connected to the base by a second control arm. The second pressure block also includes a clamping surface and a top surface. The top surface includes a cleat. The clamp has an open position and a closed position. In the open position, a cable passageway is defined between the clamping surfaces of the first and second pressure blocks and the cable channel of the base. In the closed position, the clamping surfaces of the first and second pressure blocks close the cable passageway. The clamp is biased in the closed position.

20 Claims, 7 Drawing Sheets

MID-SPAN DROP CABLE CLAMP AND METHOD

CROSS-REFERENCE TO RELATED APPLICATION

The present application claims the benefit of U.S. Provisional Patent Application Ser. No. 62/294,761, filed Feb. 12, 2016, which application is hereby incorporated by reference in its entirety.

BACKGROUND

A distribution fiber optic cable contains a plurality of optical fibers. Often distribution cables are hung above the ground on mounting poles so that the distribution cable can travel a long distance. A plurality of breakout locations exists along the distribution cable at which drop cables are separated out from the distribution cable. At a breakout location, fibers of the drop cables are typically spliced to selected fibers of the distribution cable. A drop cable is a cable that typically forms the last leg to a subscriber location (e.g., a house). For example, drop cables are routed from breakout locations or intermediate access locations (i.e., terminals) to subscriber locations. Sometimes these drop cables are routed back along a span of distribution cable that is mounted above the ground, between mounting poles. At a point along the span of distribution cable, between mounting poles, also called mid-span, the drop cable is routed horizontally to the subscriber location, often at a 90-degree angle from the distribution cable. However, mounting the drop cable to the distribution cable securely enough to complete the routing is difficult due the rigidity of the cables and the elevated nature of the distribution cable. Therefore, improvements in branching drop cables from a mid-span distribution cable location are needed.

SUMMARY

The present disclosure relates generally to a cable clamp. In one possible configuration, and by non-limiting example, the present disclosure relates to a cable clamp for mounting a drop cable along a mid-span of a distribution cable.

In a first aspect of the present disclosure, a mid-span clamp is disclosed. The mid-span clamp includes an elongate base that defines a cable channel on a top side. The clamp includes a first pressure block connected to the base by a first control arm. The first pressure block includes a clamping surface and a top surface. The top surface includes a cleat. The clamp includes a second pressure block connected to the base by a second control arm. The second pressure block also includes a clamping surface and a top surface. The top surface includes a cleat. The clamp has an open position and a closed position. In the open position, a cable passageway is defined between the clamping surfaces of first and second pressure blocks and the cable channel of the base. In the closed position, the clamping surfaces of the first and second pressure blocks close the cable passageway. The clamp is biased in the closed position.

In a second aspect of the present disclosure, a method of installing a mid-span clamp disclosed. The method includes securing a first mounting hook to a drop cable and mounting the first mounting hook to an attachment cleat on a mid-span clamp. The method includes looping the drop cable and securing a second mounting hook to the drop cable at a point beyond the loop. The method includes mounting the second mounting hook to the attachment cleat on the mid-span clamp at an angle equal to about 90 degrees from the first mounting hook. The method includes opening the mid-span clamp, raising the mid-span clamp to a distribution cable, and positioning the mid-span clamp around the distribution cable. The method includes closing the mid-span clamp to secure the mid-span clamp to the distribution cable.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The clamp disclosed herein has several advantages. The clamp provides a securing solution for mounting a drop cable to a mid-span location of a distribution cable from the ground. This improves the safety of the install and also allows the installer to operate with less equipment. Further the clamp is non-permanent and can be adjusted as needed.

Figure 1:
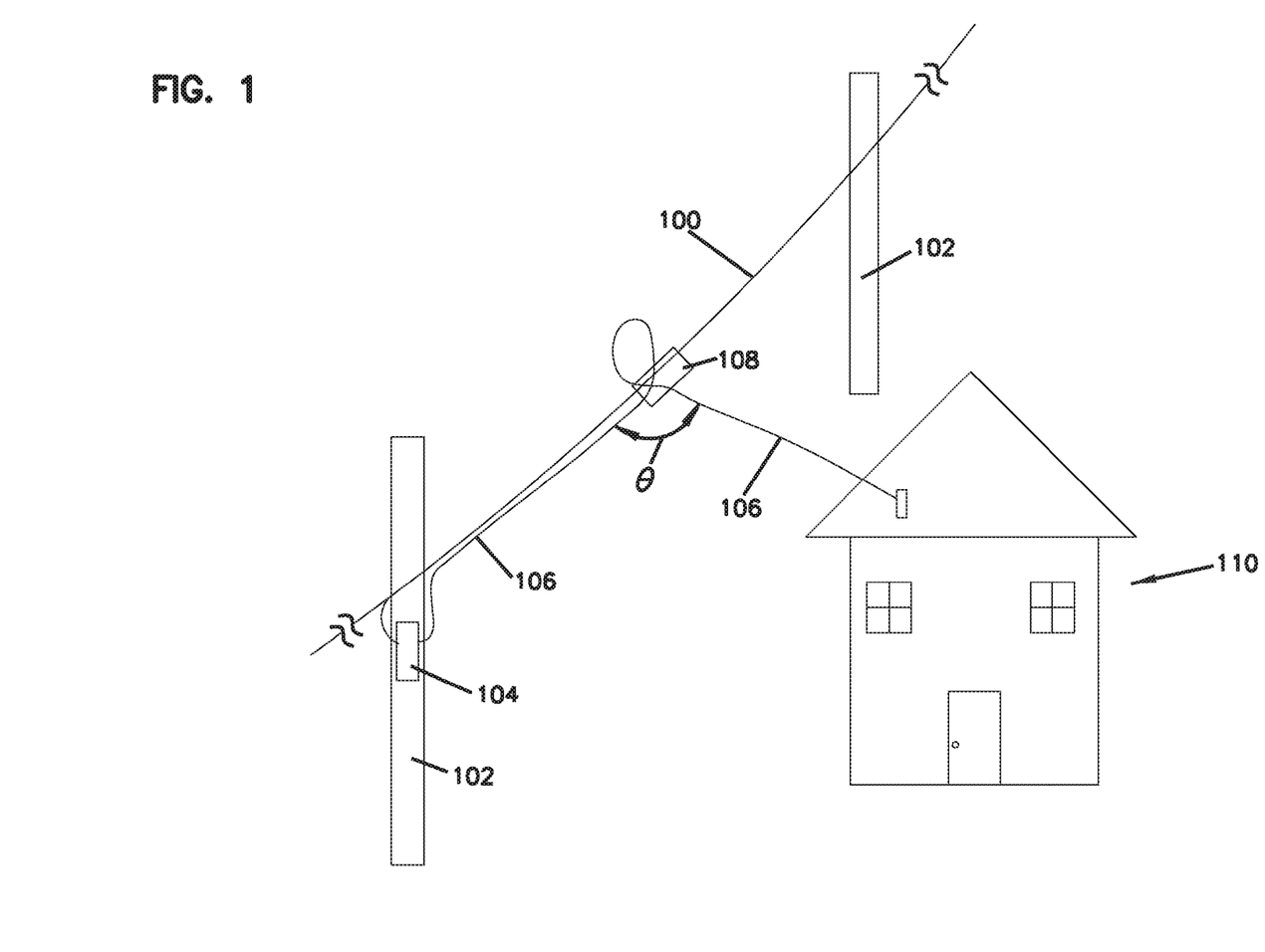
FIG. 1 illustrates a perspective schematic view of an installation environment, according to one embodiment of the present disclosure.

FIG. 1 shows a schematic of an example installation environment, according to one embodiment of the present disclosure. The distribution cable 100 is mounted at an elevated position between a pair of mounting poles 102. At one mounting a pole is a terminal 104. The terminal 104 is a location where at least one fiber from the distribution cable 100 is spliced into a drop cable 106. The drop cable 106 is routed back along the mid-span of the distribution cable 100. At a location along the mid-span of the distribution cable 100, the drop cable 106 is secured to the distribution cable 100 via a clamp 108 and routed at angle θ equal to about 90 degrees to a subscriber location (i.e., a house 110).

Figure 2:
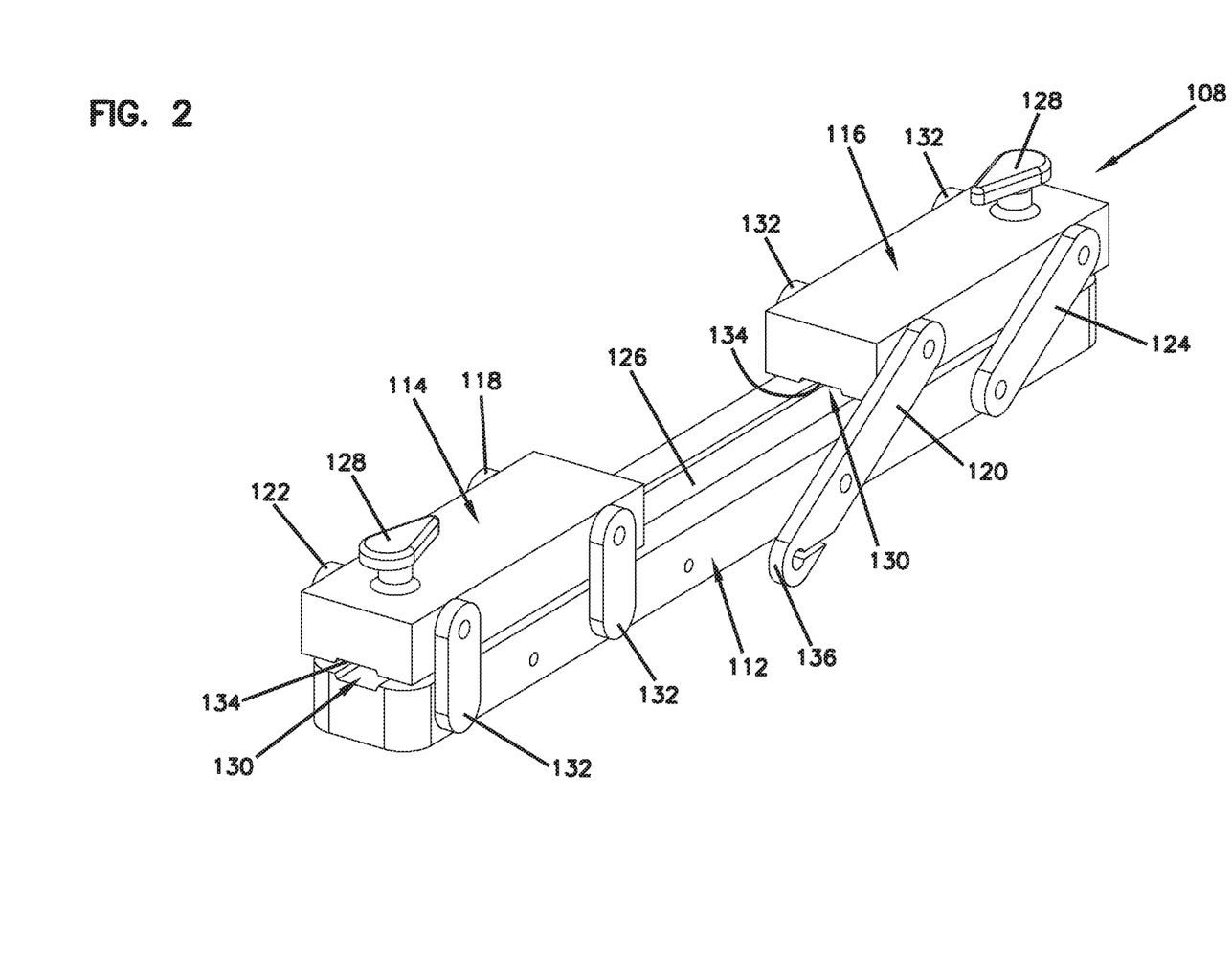
FIG. 2 illustrates a perspective view of a cable clamp, in a closed position, according to one embodiment of the present disclosure.

FIG. 2 shows a perspective view of the clamp 108. The clamp 108 includes an elongate base 112, a first pressure block 114, and a second pressure block 116. The first and second pressure blocks 114, 116 are pivotally connected to the base 112 via first and second control arms 118, 120 and first and second passive arms 122, 124. In some embodiments, pressure blocks 114, 116 are attached to the base 112 by only the control arms 118, 120.

The base 112 includes a cable channel 126 on a top side thereof. In some embodiments, the cable channel 126 includes a textured surface. In other embodiments, the cable channel 126 includes a rubberized or similar coating that is configured to grip a cable. Further, the pressure blocks 114, 116 are each mounted by the first and second control arms 118, 120 and first and second passive arms 122, 124 in a position above the cable channel 126 of the base 112. In combination with the pressure blocks 114, 116, the base 112, and specifically the cable channel 126, is configured to receive the distribution cable 100.

The pressure blocks 114, 116 are substantially similar. Each pressure block 114, 116 includes a cleat 128, a cable clamping surface 130, and a pair of cable gates 132. The pressure blocks 114, 116 are configured to rotate about the base 112 to allow the clamp 108 to transition between a closed (i.e., clamped) position and an open (i.e., not clamped) position. In some embodiments, the pressure blocks 114, 116 are biased in the closed position. FIG. 2 shows the clamp 108 in the closed position.

Figure 8:
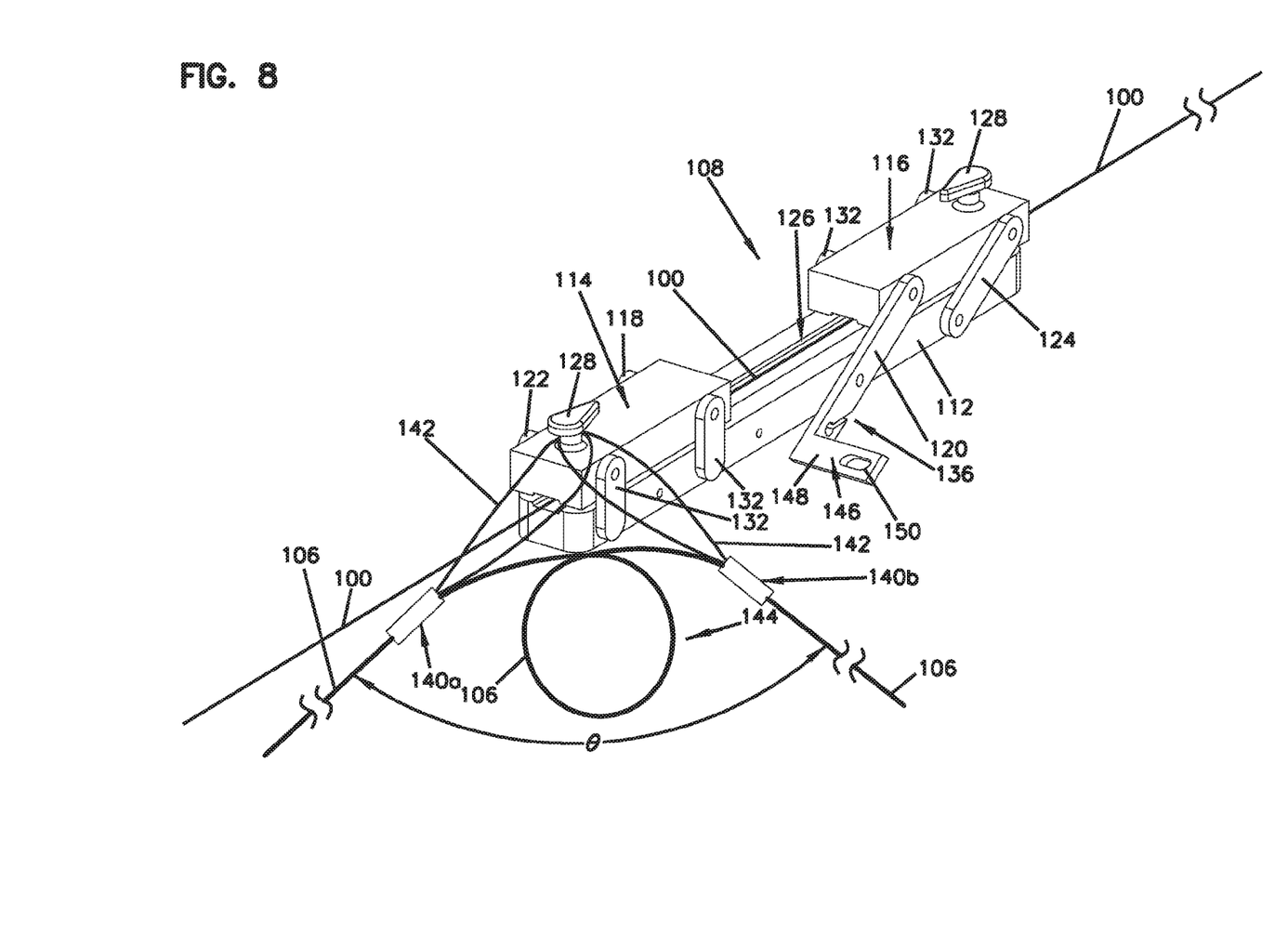
FIG. 8 illustrates a perspective view of the cable clamp of FIG. 2 installed with a drop cable and a distribution cable.

The cleats 128 can be generally t-shaped so as to hold a loop of a securing device (discussed in more detail with respect to FIG. 8). Specifically, the cleats 128 are configured to receive a P-hook cable mounting device. In the depicted embodiment, the cleats 128 have a generally teardrop shaped top portion. In some embodiments, the cleat 128 can be a ring, connector receiver, or other similar device to provide a mounting location.

The cable clamping surface 130 of each pressure block 114, 116 is the surface positioned closest to the base 112. In the depicted embodiment, the cable clamping surfaces 130 also each include a channel 134 that generally mirrors the cable channel 126 of the base 112. In some embodiments, the cable clamping surface 130 of each pressure block 114, 116 includes a textured surface. In other embodiments, the cable clamping surface 130 of each pressure block 114, 116 includes a rubberized, or similar, coating that is configured to grip a cable.

The cable gates 132 of each pressure block 114, 116 are rotatable about the pressure blocks 114, 116 and are configured to help retain the distribution cable 100 between the pressure blocks 114, 116 and the base 112 when the clamp 108 is in the closed position. In some embodiments, the cable gates 132 are configured to rotate away from the base 112 when the clamp 108 is in the open position and toward the base 112 when the clamp 108 is in the closed position.

The control arms 118, 120 are substantially similar. The control arms 118, 120 are pivotally attached to the pressure blocks 114, 116 and the base 112. In the depicted embodiment, the control arms 118, 120 are mounted at opposite sides of the base 112. Further, the control arms 118, 120 each include an attachment feature 136 at an end opposite to the end pivotally attached to the pressure blocks 114, 116. The control arms 118, 120 are positioned so that the ends of the arms 118, 120 that include the attachment features 136 are positioned below the surface of the base 112 at a point that is opposite of the top side where the cable channel 126 is disposed.

The attachment feature 136 of each control arm 118, 120 is configured to receive a component that biases the pressure blocks 114, 116 into the closed position. For example, a spring can be used to connect the two control arms 118, 120 by attaching to the two attachment features 136. When the two control arms 118, 120 are moved away from each other, (i.e., when the clamp 108 is moved to the open position) the spring stretches and exerts a force on the control arms 118, 120 so as try to move them toward one another, thereby biasing the clamp 108 to the closed position. In some embodiments, an elastic band can be used to connect the two control arms 118, 120. In the depicted embodiment, the attachment features 136 are hooks. In other embodiments, the attachment features 136 can be arms that extend away from the control arms 118, 120.

Figure 3:
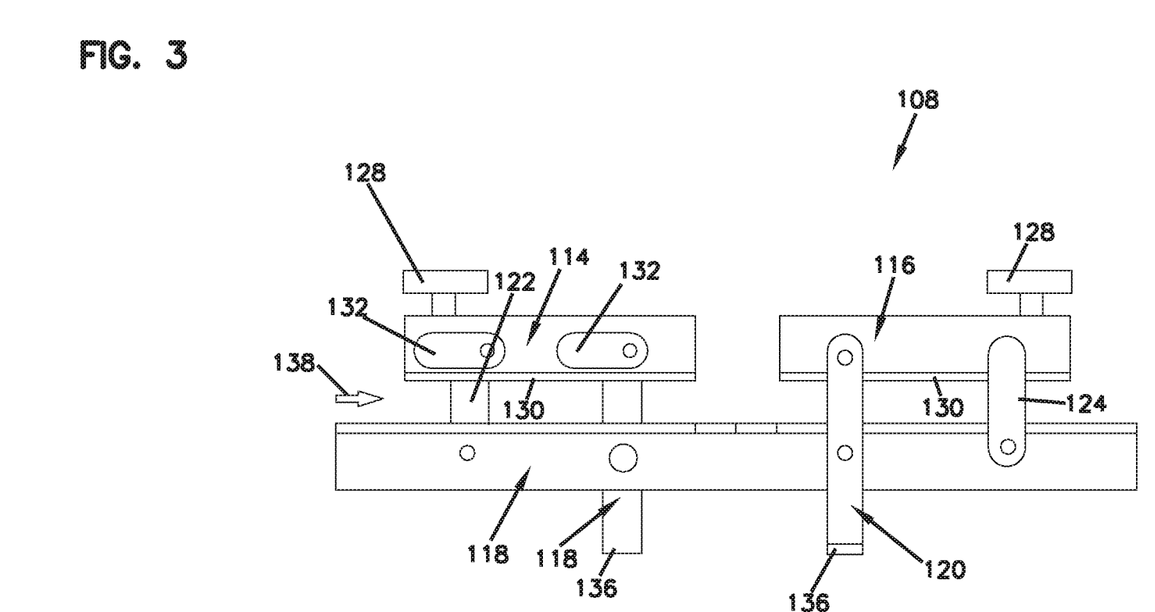
FIG. 3 illustrates a side view of the cable clamp of FIG. 2 in the open position.

FIG. 3 shows the clamp 108 in the open position. The pressure blocks 114, 116 are shown positioned above, but not in contact with, the base 112. Further, the control arms 118, 120 are shown positioned generally perpendicular to the base 112. When in the open position, a large open cable passageway 138 is defined between the cable channel 126 of the base 112 and the clamping surfaces 130 of the pressure blocks 114, 116. In the open position, the clamp 108 can be positioned so that the distribution cable 100 is aligned along the cable passageway 138. Also, when in the open position, the cable guides 132 of each pressure block 114, 116 are rotated so as to allow sides of the cable passageway 138 to be open.

Figure 4:
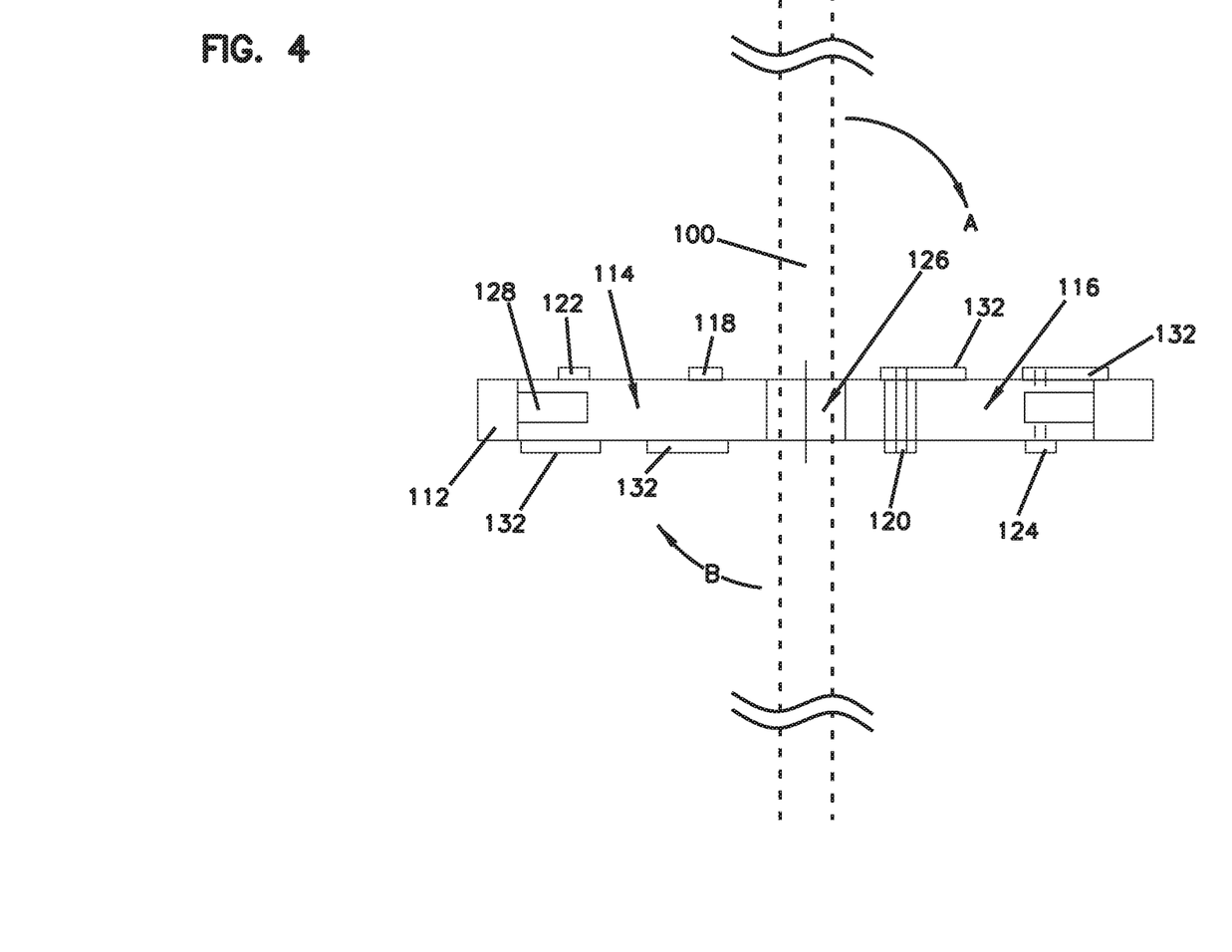
FIG. 4 illustrates a top view of the cable clamp of FIG. 2 in the open position.

FIG. 4 shows a top view of the clamp 108 in the open position. To install the clamp 108 onto the distribution cable 100, the distribution cable 100 is first positioned between the pressure blocks 114, 116, generally perpendicular to the cable passageway 138 and contacting the cable channel 126 of the base 112. To align the distribution cable 100 with the cable passageway 138, the cable 100 is rotated (as shown by arrows A and B) in the direction toward the open cable gates 132 of the pressure blocks 114, 116. Because the cable gates 132 are rotated to allow the sides of the cable passageway 138 to be open, the distribution cable 100 can be rotated to align with cable passageway 138. Once aligned along the cable passageway 138, the clamp 108 can be moved to the closed position so as to partially close the cable passageway 138, securing the distribution cable 100 between the base 112 and the pressure blocks 114, 116.

Figure 5:
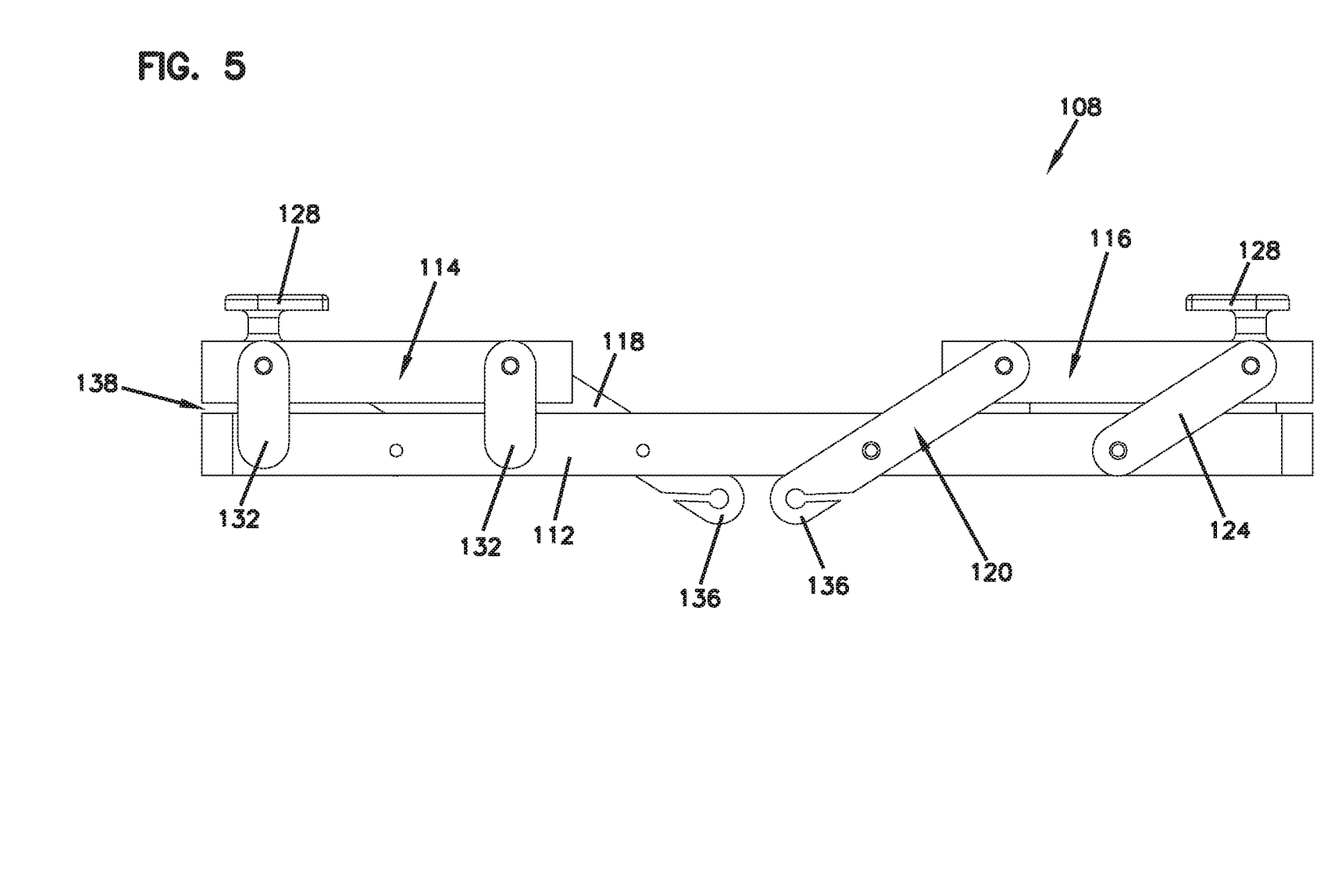
FIG. 5 illustrates a side view of the cable clamp of FIG. 2 in the closed position.

FIG. 5 shows a side view of the clamp 108 in the closed position. The clamp 108 is shown not secured to a distribution cable 100. Further, the cable passageway 138 is shown to be substantially closed off.

Figure 6:
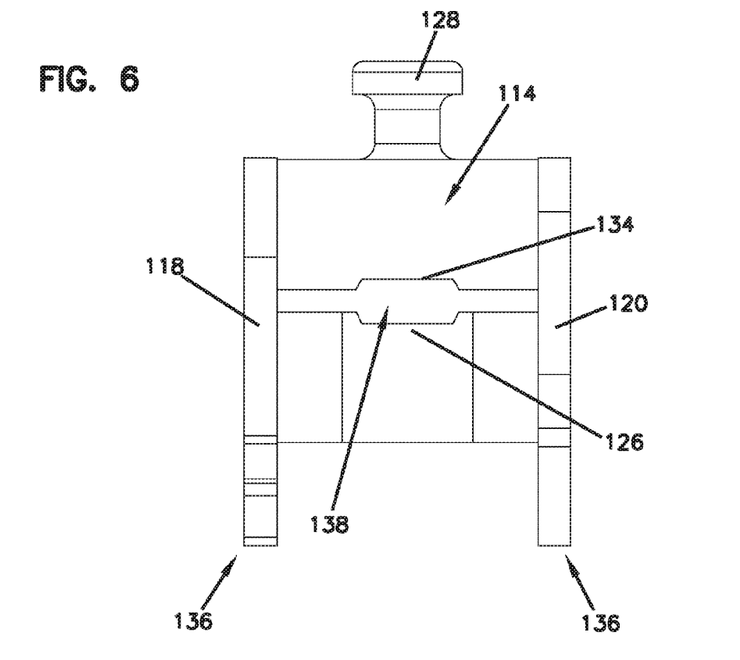
FIG. 6 illustrates a front view of the cable clamp of FIG. 2 in the closed position.
Figure 7:
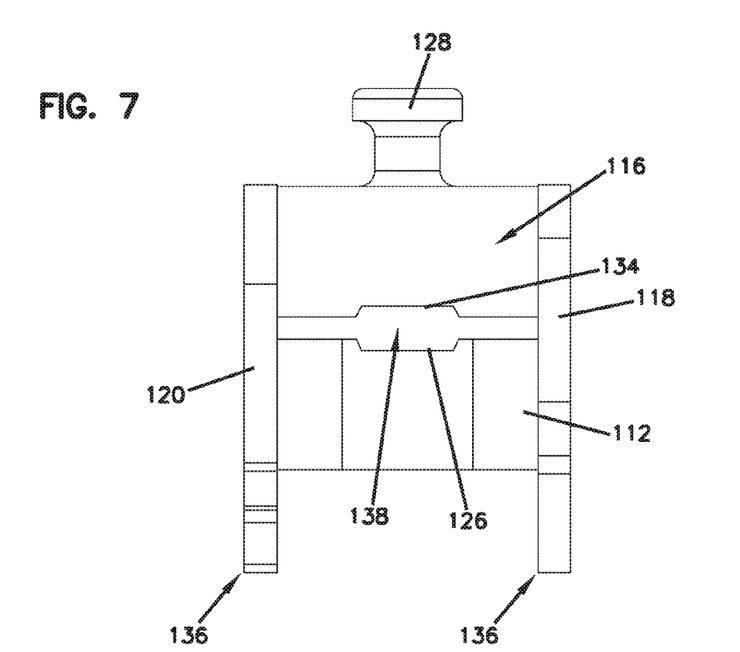
FIG. 7 illustrates a back view of the cable clamp of FIG. 2 in the closed position.

FIGS. 6 and 7 show end views of the clamp 108 in the closed position. In the depicted embodiment, the cable channels 134, 126 are shaped to receive a flat distribution cable 100. However, in some embodiments, the cable channels 134, 126 can be shaped to receive a round cable or other differently shaped cable as well.

FIG. 8 shows the drop cable 106 installed on the clamp 108. In the depicted embodiment, the clamp 108 has been clamped to the distribution cable 100 and is in the closed position. A pair of mounting hooks 140 is shown to be secured to the drop cable 106 so as to be non-moving with respect to the drop cable 106. The mounting hooks 140 can be of a variety of different types. In the depicted embodiment, the mounting hooks 140 are known as p-hooks, or p-clamps. Each mounting hook 140 includes a mounting loop 142. Each mounting loop 142 of each mounting hook 140 is shown secured around the cleat 128 of the pressure block 114. The mounting hooks 140 can be similarly mounted to the cleat 128 of the pressure block 116 as well. The drop cable 106 is first is aligned with the distribution cable 100, and the first mounting hook 140a is secured to the cleat 128, generally in line with the distribution cable 100. The drop cable 106 is then coiled into a loop 144 and routed at an angle θ that is generally equal to about 90 degrees from the distribution cable 100. The second mounting hook 140b is then also attached to the cleat 128, and the drop cable 106 is then routed to the subscriber location.

In some embodiments, the clamp can include a connecting feature 146 to connect to an installation pole. In the depicted embodiment, the connecting feature 146 is an extension 148 from the control arm 120. The extension 148 includes a hole 150 to connect to the installation pole. In some embodiments, the control arm 118 includes a similar connecting feature.

The clamp 108 described above is configured to be installed by an installer from the ground. This can be accomplished by using a pole to raise the clamp 108 to the distribution cable 100. The pole can include a feature to keep the clamp 108 in the open position until the clamp 108 is positioned around the distribution cable 100. To install the clamp 108, the installer first prepares the drop cable 106 by securing the pair of mounting hooks 140a, 140b to the drop cable 106. The drop cable 106 is then secured to one of the cleats 128, as shown similarly in FIG. 8. Once the drop cable 106 is secured to the clamp 108, the clamp 108 is secured to the installation pole and held in the open position. In one embodiment, the pole includes features that hold the control arms 118, 120 in a spaced apart relationship, thereby keeping the clamp 108 in the open position. The installer then raises the installation pole with the clamp 108 and drop cable 106 to the height where the distribution cable 100 is mounted. Similar to as shown in FIG. 4, the installer approaches the distribution cable 100 with the clamp 108 positioned generally perpendicular to the distribution cable 100. The installer positions the distribution cable 100 between the pressure blocks 114, 116 until the distribution cable 100 contacts the base 112. Once the distribution cable 100 contacts the base 112, the installer rotates the clamp 108 by rotating the installation pole, in a direction toward the cable gates 132 of the clamp 108.

Once the clamp 108 has been rotated so that the distribution cable 100 aligns with the cable passageway 138 of the open clamp 108, the installer moves the clamp 108 to the closed position to secure the clamp 108 to the distribution cable 100. In some embodiments, closing the clamp 108 requires the installer to lower the pole away from the clamp 108 to allow the clamp 108 to bias to a closed position. In other embodiments, a rip cord release system may be used, where a rip cord is attached to the clamp 108, and upon removing the rip cord, the clamp 108 moves to the closed position. In such an embodiment, the rip cord can be operated by hand from the ground or can be attached to the installation pole.

If the clamp 108 needs to be repositioned on the distribution cable 100, the installer can use the installer pole to exert a force on one of the pressure blocks 114, 116 in the direction that the installer wishes to move the clamp 108. The force can be generally in the longitudinal direction of the base 112. Such a force will cause either of the pressure blocks 114, 116 to rotate about the base 112 via the control arms 118, 120 and move to an open position. This allows the installer to move the clamp 108 along the distribution cable 100 without needing to open the opposite pressure block. This is useful as it allows the clamp 108 to remain secured to the distribution cable 100, while also allowing the installer to reposition the clamp 108 as necessary.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

I claim:

1. A mid-span drop cable clamp comprising:
    an elongate base defining a cable channel on a top side;
    a first pressure block connected to the base by a first control arm, the first pressure block having a clamping surface and a top surface, the top surface having a cleat;
    a second pressure block connected to the base by a second control arm, the second pressure block having a clamping surface and a top surface, the top surface having a cleat;
    wherein the clamp has an open position and a closed position, wherein, in the open position, a cable passageway is defined between the clamping surfaces of the first and second pressure blocks and the cable channel of the base, wherein, when in the closed position, the clamping surfaces of the of first and second pressure blocks close the cable passageway, and wherein the clamp is biased in the closed position.

2. The mid-span drop cable clamp of claim 1, wherein the cleats of the first and second pressure blocks are t-shaped.

3. The mid-span drop cable clamp of claim 1, wherein the first and second pressure blocks are also each connected to the base by way of a passive arm.

4. The mid-span drop cable clamp of claim 1, wherein the first and second pressure blocks are pivotally movable about the base.

5. The mid-span drop cable clamp of claim 1, wherein the cleats of the first and second pressure blocks are configured to receive and retain a cable mounting hook.

6. The mid-span drop cable clamp of claim 5, wherein the cable mounting hook is a P-hook.

7. The mid-span drop cable clamp of claim 1, wherein a spring is attached to the first and second control arms adjacent a bottom side of the base, opposite from the cable channel.

8. The mid-span drop cable clamp of claim 1, wherein the clamp is removably attachable to an installation pole for installing the clamp on a distribution fiber optic cable.

9. A mid-span drop cable clamp comprising:
    an elongate base defining a cable channel on a top side;
    a first pressure block pivotally connected to the base; and
    a second pressure block pivotally connected to the base,
    wherein the clamp has an open position and a closed position, wherein, in the open position, a cable passageway is defined by the first and second pressure blocks and the cable channel of the base, wherein, when in the closed position, the first and second pressure blocks close the cable passageway.

10. The mid-span drop cable clamp of claim 9, wherein the first pressure block includes a clamping surface and a top surface, the top surface including a cable securing device.

11. The mid-span drop cable clamp of claim 10, wherein the cable securing device of the first pressure block is a cleat.

12. The mid-span drop cable clamp of claim 9, wherein the second pressure block includes a clamping surface and a top surface, the top surface including a cable securing device.

13. The mid-span drop cable clamp of claim 12, wherein the cable securing device of the second pressure block is a cleat.

14. The mid-span drop cable clamp of claim 9, wherein, in the open position, a cable passageway is defined between clamping surfaces defined by each of the first and second pressure blocks and the cable channel of the base.

15. The mid-span drop cable clamp of claim 9, wherein the first pressure block is connected to the base by a first control arm.

16. The mid-span drop cable clamp of claim 9, wherein the second pressure block is connected to the base by a second control arm.

17. The mid-span drop cable clamp of claim 9, wherein a spring is attached to the first and second control arms adjacent a bottom side of the base, opposite from the cable channel.

18. The mid-span drop cable clamp of claim 9, wherein the clamp is biased in the closed position.

19. A method of installing a mid-span clamp comprising:
securing a first mounting hook to a drop cable;
mounting the first mounting hook to an attachment cleat on a mid-span clamp;
looping the drop cable;
securing a second mounting hook to the drop cable at a point beyond the loop;
mounting the second mounting hook to the attachment cleat on the mid-span clamp at an angle equal to about 90 degrees from the first mounting hook;
opening the mid-span clamp;
raising the mid-span clamp to a distribution cable;
positioning the mid-span clamp around the distribution cable; and
closing the mid-span clamp to secure the mid-span clamp to the distribution cable.

20. The method claim 19, further comprising rotating the mid-span clamp about the distribution cable to position the mid-span clamp around the distribution cable.

\* \* \* \* \*